United States Patent [19]

Buhrer

[11] Patent Number: 4,744,075
[45] Date of Patent: May 10, 1988

[54] MULTICHANNEL WAVELENGTH MULTIPLEXER/DEMULTIPLEXER

[75] Inventor: Carl F. Buhrer, Framingham, Mass.

[73] Assignee: GTE Laboratories Incorporated, Waltham, Mass.

[21] Appl. No.: 33,275

[22] Filed: Apr. 2, 1987

[51] Int. Cl.⁴ .......................... H04B 9/00; H04J 1/08; G02B 5/30
[52] U.S. Cl. ............................... 370/3; 370/2; 455/616; 350/401; 350/403
[58] Field of Search .................. 370/1, 2, 3; 350/400, 350/401, 402, 403; 455/616

[56] References Cited

U.S. PATENT DOCUMENTS

| | | | |
|---|---|---|---|
| 2,182,142 | 12/1939 | Ball et al. | 350/401 |
| 3,532,890 | 10/1970 | Denton | 370/2 |
| 3,584,221 | 6/1971 | Furukawa | 370/2 |
| 4,566,761 | 1/1986 | Carlsen et al. | 350/401 |
| 4,685,773 | 8/1987 | Carlsen et al. | 350/401 |

FOREIGN PATENT DOCUMENTS 0157003  12/1979  Japan ..................... 370/2

Primary Examiner—Michael A. Masinick
Assistant Examiner—Andrew J. Telesz, Jr.
Attorney, Agent, or Firm—Fred Fisher

[57] ABSTRACT

An n channel birefringent multiplexer/demultiplexer consists of $\log_2 n$ sequences of birefringent crystal elements in Solc-type filter configuration. The configuration of polarizing beam splitters have one such beam splitter before the first sequence, one such beam splitter after the last sequence, and solely one such beam splitter between adjacent sequences of birefringent elements. With such multiplexer/demultiplexer horizontally and vertically polarized components of an input beam are separated at the input beam splitter, independently traverse all of the sequences of the birefringent elements and are recombined to form output beams only upon reaching the output beam splitter.

3 Claims, 3 Drawing Sheets

MULTICHANNEL WAVELENGTH MULTIPLEXER/DEMULTIPLEXER

CROSS-REFERENCE TO RELATED APPLICATIONS

This invention is related to pending U.S. patent application Ser. No. 018232 entitled "Multiple Channel Wavelength Division Multiplexer/Demultiplexer" by Barbara M. Foley, filed on Feb. 24, 1987. Barbara M. Foley is a co-employee with GTE Laboratories Incorporated, the assignee being common hereto. The Barbara M. Foley application, in turn, is related to a pending U.S. patent application Ser. No. 791,820, filed Oct. 22, 1985 now U.S. Pat. No. 4,685,773 issued Aug. 11, 1987 entitled "Birefringent Optical Multiplexer with Flattened Bandpass" by W. John Carlsen and Paul Melman. W. John Carlsen and Paul Melman are co-employees at GTE Laboratories Incorporated, the common assignee of this invention. The Carlsen/Melman application is a continuation-in-part of Ser. No. 650,012 filed Sept. 13, 1984 now U.S. Pat. No. 4,566,761 issued Jan. 28, 1986.

BACKGROUND OF THE INVENTION

1. Field of the Invention

This invention relates to multichannel optical wavelength multiplexers/demultiplexers. Accordingly, it is a general object of this invention to provide new and improved multiplexers/demultiplexers of such character.

2. General Background

An optical birefringent filter of the type first described by Solc in 1953 and reviewed in his article "Birefringent Chain Filters", Journal of the Optical Society of America, Vol. 55, No. 6, pp. 621–625 (1965), is particularly adaptable for use in wavelength division multiplexers and demultiplexers because it consists of a substantially lossless network of birefringent crystal elements between two polarizing devices. Its transmission characteristics are periodic functions of optical frequency that can be shaped as desired by choosing an appropriate number of equal length elements and their rotational orientations according to a synthesis procedure outlined by S. E. Harris, E. O. Ammann and I. C. Chang, "Optical Network Synthesis Using Birefringent Crystals. I. Synthesis of Lossless Networks of Equal-Length Crystals", Journal of the Optical Society of America, Vol. 54, No. 10, pp. 1267–1279 (1964). A single birefringent element between two polarizing beam splitters to make a polarization insensitive wavelength demultiplexer that is useful in fiber optic systems has been described by P. Melman, W. J. Carlsen and B. Foley, "Tunable birefringent wavelength-division multiplexer/demultiplexer", in Electronic Letters, Vol. 21, No. 15, pp. 634–635 (1985). There, they describe their splitting of an input beam into two orthogonal plane polarized components that pass in parallel through the birefringent element and are then combined in a second polarizing beam splitter to yield two output beams consisting of the input light separated according to wavelength.

Carlsen and Melman describe an n channel demultiplexer configured as a tree structure of n-1 two channel demultiplexers each with a single birefringent element in their U.S. Pat. No. 4,566,761 referred to hereinabove. As shown therein, each stage would have a sinusoidal transfer function, and successive stages would have halved periods. An input beam with n wavelength channel components would be demultiplexed into two, four, and finally n output beams, each containing only one wavelength channel. Successive stages would consist of two polarizing beam splitters between which would be located a birefringent network with an appropriate number of elements to achieve the desired transfer function.

Related art to the present invention includes a configuration disclosed by B. M. Foley in her application Ser. No. 018232 referred to hereinabove. It includes successive stages of birefringent filters, each including a sequential network of birefringent crystal elements between polarizing beam splitters. In a demultiplexer mode of operation, they separate an input beam into four output beams. Each output beam contains light wavelengths in only one of the optical wavelength channels determined by the transmission functions of each filter. The overall device is reversible, and, in the reverse direction multiplexer mode, four separate beams enter the device, merge, and exit as a single beam, provided that each of the separate beams consists only of light within the optical wavelength channels determined by the same transmission functions.

In terms of its operation as a demultiplexer, the input beam enters a beam splitter prism where only a first vertically polarized component is reflected by a dielectric multilayer coating, and is thereby separated from a second horizontally polarized component which continues into an initial sequential network of eleven birefringent crystal elements. The first component beam is again reflected internally in the prism at a facet which is parallel to the plane of the coating. It, then, also traverses the initial sequential network parallel to the second component. After undergoing wavelength dependent polarization transformations, both enter a second beam splitter where the first component is again internally reflected and recombined with the second component at a dielectric multilayer coating associated with the second beam splitter. Vertically and horizontally polarized components of each of the first and second components are reflected or transmitted respectively by this latter polarizing coating. Wavelength components of the input beam that fall within separate channels A and B (FIG. 1a) undergo essentially no net change in polarization state in traversing the sequential network and appear in one beam, while wavelength components that fall within channels C and D (FIG. 1a) are essentially converted to the opposite polarization state and appear in a different beam.

The second filter stage functions in essentially the same manner except that it is rotated in orientation by 90 degrees such that its parallel input beams are processed independently. Each is separated by another input polarizing beam splitter into horizontally and vertically polarized components which traverse a sequential network of five birefringent crystal elements and recombine in still another output polarizing beam splitter. Wavelength components of input beams that fall within channels A and C of FIG. 1b undergo essentially no net change in polarization state in traversing the latter filter stage and appear in two of the output beams, while wavelength components that fall within channels B and D are essentially converted to the opposite polarization state and appear in two other output beams. Together, the two stages separate wavelength components of the input beam within the four channels into four separate output beams.

An alternative geometry for a four channel birefringent multiplexer/demultiplexer includes two stages that function in the same way as described above, but the second stage is not rotated relative to the first. Instead, it is made broader to accommodate four parallel beams in the same plane as the two beams in the first stage filter.

SUMMARY OF THE INVENTION

In accordance with another object of this invention, a multichannel birefringent multiplexer/demultiplexer does not require two cascaded filter stages in which wavelength components entering the input are first separated into two groups by a first stage, and then into four groups by a second stage and the like.

Still another object of this invention is to provide for a new and improved multichannel birefringent multiplexer/demultiplexer in which only one beam splitter prism is located between two adjacent sequential networks of birefringent crystal elements.

Yet another object of this invention is to provide for a new and improved multichannel wavelength multiplexer/demultiplexer in which the two orthogonally polarized component beams from each sequential network of birefringent crystal elements are further separated in a single beam splitter and are not recombined until the component beams reach the last output beam splitter.

Still yet another object of this invention is to provide for a new and improved multichannel wavelength multiplexer/demultiplexer in which the polarizing beam splitter between two adjacent sequential networks of birefringent crystal elements contains two dielectric coated interfaces, but wherein each of the component beams is reflected or transmitted only once by a dielectric coated interface of such polarizing beam splitter.

In accordance with one aspect of this invention, a combination of polarizing beam splitters are provided in an n channel birefringent multiplexer/demultiplexer having $\log_2 n$ sequential networks of birefringent crystal elements, wherein n represents the number of optical wavelength channels capable of being multiplexed/demultiplexed and $\log_2 n$ is an integer greater than one. A first of the beam splitters (termed an "input beam splitter") is oriented before the first of the sequential networks, and another of the beam splitters (referred to as an "output beam splitter") is oriented after the last of the sequential networks. Solely one such beam splitter is oriented between each adjacent pair of said sequential networks of birefringent crystal elements such that, upon application of an input beam to the input beam splitter, horizontally and vertically polarized components thereof are separated thereat, independently traverse all of the sequential networks of birefringent crystal elements, and recombine to form output beams solely upon reaching the output beam splitter following the last of the sequential networks.

In accordance with another aspect of the invention, multiple channel birefringent demultiplexing apparatus includes $\log_2 n$ sequential networks of birefringent crystal elements which are serially coupled together, wherein n represents the number of optical wavelength channels capable of being demultiplexed and wherein $\log_2 n$ is an integer greater than one. The apparatus includes an input polarizing beam splitter means coupled to a first of the sequential networks filters for converting an input beam of collimated light whose polarization is immaterial into two orthogonally plane polarized beams parallel to each other. An output polarizing beam splitting means is coupled to a last of the sequential networks for converting n intermediate beams, each intermediate beam having a pair of different wavelength channels with different polarizations into n single wavelength channel output beams of immaterial polarization. Solely one intermediate beam splitter means is oriented between each adjacent pair of sequential networks of birefringent crystal elements. Each one intermediate beam splitter means contains two beam splitting coatings, whereby upon application of an input beam to the input beam splitting means, horizontally and vertically polarized components thereof are separated thereby, independently traversing all of the sequential networks including all the intermediate beam splitting means. They are then recombined as intermediate beams to form n output beams solely upon action by the output polarizing beam splitting means upon the n intermediate beams reaching the output beam splitting means.

Still another aspect of this invention is to provide a new and improved multiple channel birefringent demultiplexing apparatus which includes $\log_2 n$ sequential networks of birefringent crystal elements serially coupled together. The number of optical wavelength channels capable of being demultiplexed is represented by n, and $\log_2 n$ is an integer greater than one. An input polarizing beam splitting means is coupled to a first of the sequential networks of birefringent crystal elements. The input polarizing beam splitting means has a single beam splitting coating for converting an input beam of collimated light whose polarization is immaterial into two orthogonally polarized beams parallel to each other. One of the polarized beams is reflected once by the single beam splitting coating, the other of the polarized beams is transmitted once by the single beam splitting coating. Solely one intermediate beam splitting means is oriented between the first sequential network of birefringent crystal elements and an adjacent second one of the sequential networks of birefringent crystal elements. The intermediate beam splitting means has two independent beam splitting coatings therein so that one of the polarized beams transformed by the first sequential network is directed to one of the two independent beam splitting layers. The other of the polarized beams transformed by the first sequential network is directed to the other of the two independent beam splitting coatings, yielding four transformed beams parallel to each other. An output polarizing beam splitting means having one beam splitting coating is coupled to the output of the last sequential network of birefringent crystal elements for converting n pairs of the wavelength channels at different polarizations to n single wavelength channel output beams of immaterial polarization.

BRIEF DESCRIPTION OF THE DRAWING

Other objects, advantages, and features of this invention, together with its construction and mode of operation, will become more apparent from the following description, when read in conjunction with the accompanying drawing, in which.

DESCRIPTION OF PREFERRED EMBODIMENTS

Figure 1A:
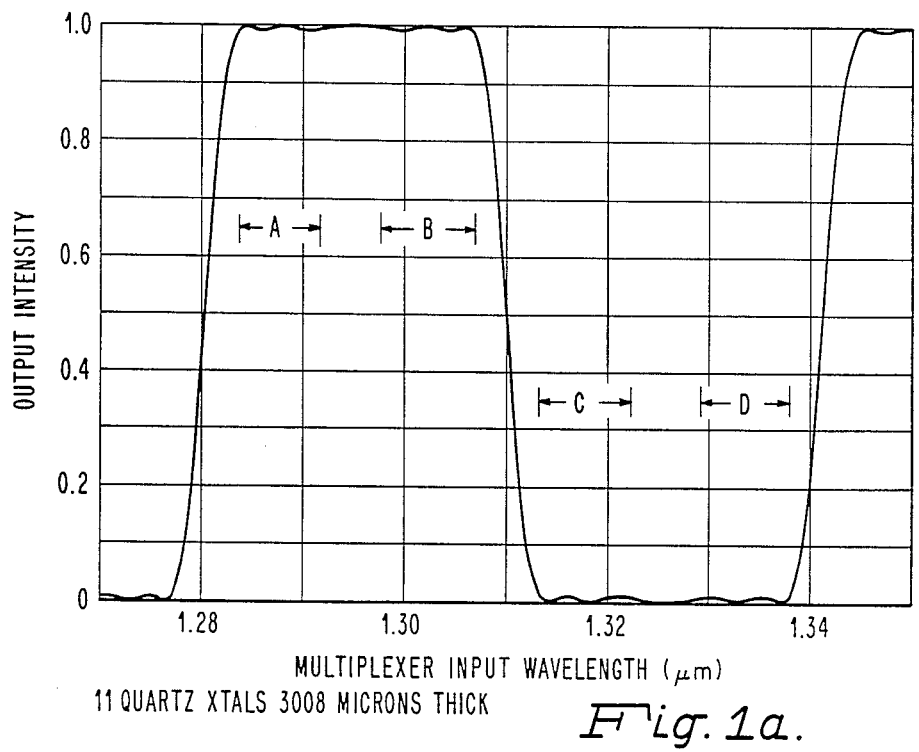
FIG. 1(a) is a transmission function diagram for a birefringent filter in which channels A and B undergo essentially no net change in polarization state in traversing one sequential network of birefringent crystal elements and appear in one unique beam, while wavelengths that fall within channels C and D are essentially transformed to the opposite polarization state and appear in a second unique beam.
Figure 1B:
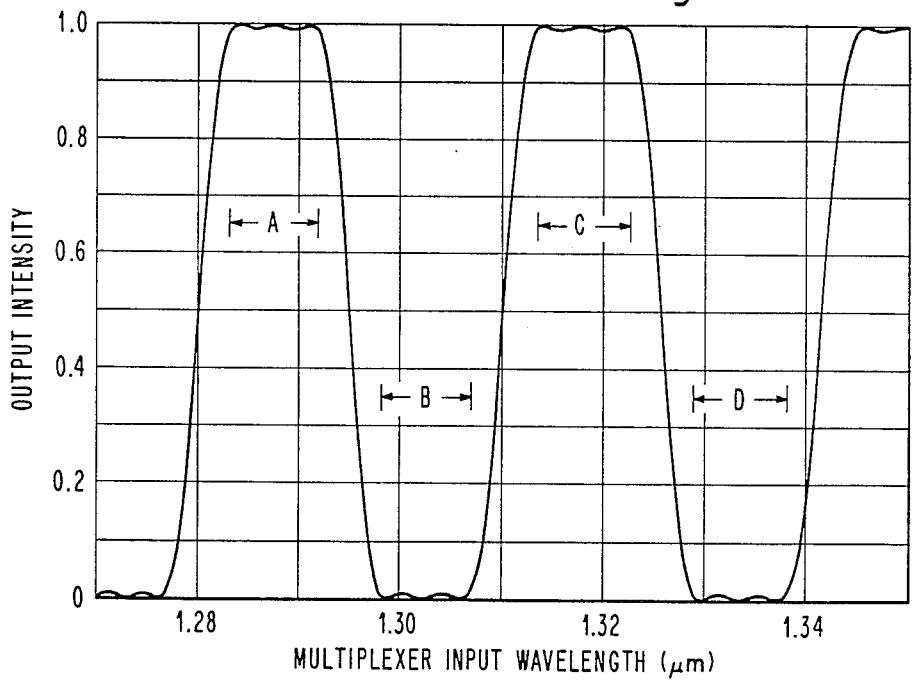
FIG. 1(b) is a transmission function diagram for another birefringent filter in which channels A and C undergo essentially no net change in polarization state in traversing a different sequential network of birefringent crystal elements and appear in one integral beam, while wavelengths that fall within channels B and D are essentially transformed to the opposite polarization state and appear in a second integral beam.
Figure 2A:
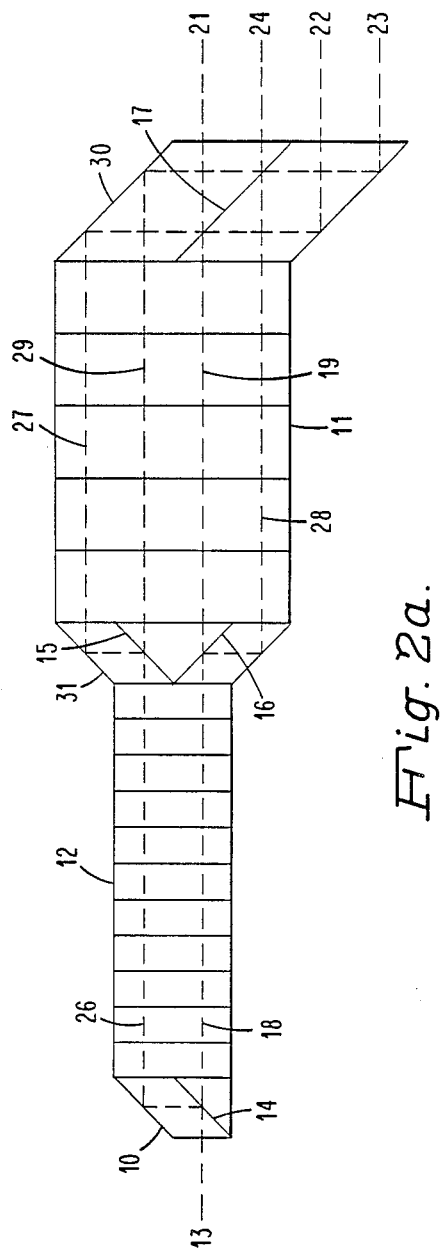
FIGS. 2(a) and 2(b) are diagrams depicting side and perspective views, respectively, of one embodiment of the invention.
Figure 2B:
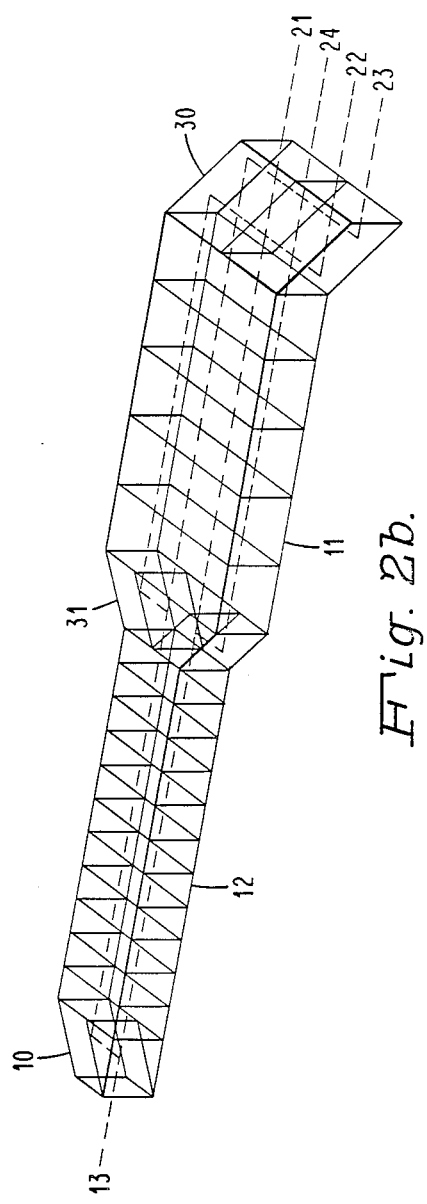

The optical intensity transfer functions of the birefringent filters upon which all of the above described four channel demultiplexers are based are shown in FIGS. 1(a) and 1(b). The sequential network 11 (FIG. 2) includes five quartz crystal element plates each having a thickness of 5978 microns and oriented with its optic axis perpendicular to the beam direction. From left to right these axes are also rotationally oriented relative to the principal polarization axes of the beam splitter devices at angles of 45, −14.5, −14.5, 9.31, and 9.31 degrees. FIG. 1(b) represents the fraction of the beam intensity that leaves the five element sequential network 11 with the same linear polarization state in which it entered. The angles are chosen using the synthesis technique of Harris et al. supra. Similarly, a sequential network 12 consists of eleven quartz crystal element plates each having a thickness of 3008 microns and oriented with its optic axis perpendicular to the beam direction. From left to right their orientation angles are 45, −2.71, −2.71, −41.65, −41.65, 15.20, 15.20, 30.36, 30.36, −26.04, and −26.04 degrees. FIG. 1(a) represents the fraction of the beam intensity that leaves the eleven element sequential network 12 with the same linear polarization state in which it entered. Both approximate square wave transmission functions with uniform and equal passband and stopband ripples. The eleventh order network 12 has thinner elements and therefore a longer wavelength period. The higher order is required to achieve approximately the same cutoff characteristic as the fifth order network 11. Since in both sequential networks 11, 12 there are identically oriented adjacent elements, they may in fact be double length plates thereby simplifying their fabrication.

The wavelength components of an input beam 13 that fall within channel A (see FIGS. 1(a) and 1(b)) undergo essentially no net change in polarization state while traversing either the network 12 or the network 11. Their horizontally polarized component is transmitted by dielectric multilayer coatings 14, 16, 17, so that after traversing the networks 12 and 11 as beams 18 and 19 it emerges as part of an output beam 21. Their vertically polarized component is reflected by dielectric multilayer coatings 14, 15, 17, so that after traversing the sequences 12, 11 as beams 26, 27 it also emerges as part of the output beam 21.

The wavelength components of the input beam 13 that fall within channel B (FIGS. 1(a) and 1(b)) are reversed in polarization state only while traversing the network 11. Their horizontally polarized component is transmitted by the dielectric multilayer coatings 14, 16, but while traversing the network 11 as the beam 19, it becomes vertically polarized. After reflection by the dielectric multilayer coating 17 it emerges as part of the output beam 22. Their vertically polarized component is reflected by the dielectric multilayer coatings 14 and 15, but while traversing the network 11 as the beam 27, it becomes horizontally polarized. After transmission by the dielectric multilayer coating 17 it also emerges as part of the output beam 22.

The wavelength components of the input beam 13 that fall within channel C (FIGS. 1(a) and 1(b)) are reversed in polarization state only in traversing the network 12. Their horizontally polarized component is transmitted by the dielectric multilayer coating 14, but while traversing network 12 as the beam 18, it becomes vertically polarized and is then reflected by dielectric multilayer coating 16. It continues as the beam 28 unchanged through the network 11, and after reflection by dielectric multilayer coating 17 it emerges as part of the output beam 23. Their vertically polarized component is reflected by the dielectric multilayer coating 14, but while traversing network 12 as beam 26, it becomes horizontally polarized and is then transmitted by the dielectric multilayer coating 15. It continues as beam 29 unchanged through the network 11, and after transmission by dielectric multilayer coating 17 it also emerges as part of the output beam 23.

The wavelength components of the input beam 13 that fall within channel D (FIGS. 1(a) and 1(b)) are reversed in polarization state while traversing both networks 12 and 11. Their horizontally polarized component is transmitted by the dielectric multilayer coating 14, but, while traversing the network 12 as the beam 18, it becomes vertically polarized and is then reflected by the dielectric multilayer coating 16. While traversing the network 11 as the beam 28 it again becomes horizontally polarized and after transmission by the dielectric multilayer coating 17 it emerges as part of the output beam 24. Their vertically polarized component is reflected by the dielectric multilayer coating 14, but while traversing the network 12 as the beam 26, it becomes horizontally polarized and is then transmitted by the dielectric multilayer coating 15. While traversing the network 11 as the beam 29 it again becomes vertically polarized, and after reflection by the dielectric multilayer coating 17 it also emerges as part of the output beam 24.

Thus, the wavelength components of the input beam 13 that fall within the channels A, B, C, or D of FIGS. 1(a) and 1(b) are routed in a demultiplexing mode of operation to the outputs 21, 22, 23, and 24, respectively, regardless of their input polarization states. When used in the right to left multiplexing mode of operation, four input channels A, B, C, and D when applied to the ports 21, 22, 23, 24, respectively, become combined with essentially no loss into the composite beam 13.

Figure 3:
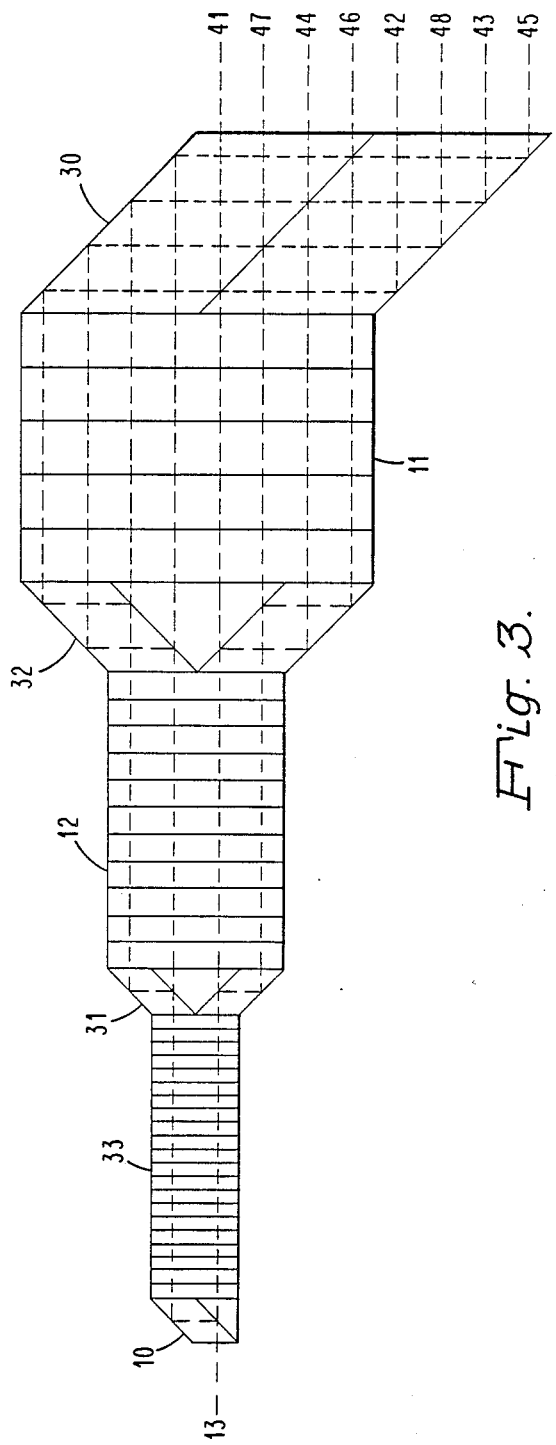
FIG. 3 is a diagram of another embodiment of the invention.

The present invention is an n channel birefringent multiplexer/demultiplexer using $\log_2 n$ sequential networks of birefringent crystal elements, but with only a single polarizing beam splitting interface between adjacent networks. The optical intensity transfer functions approximate square waves with filter sequences having periods in a 1:2:4:8::: ratio. The longer period functions should have essentially the same absolute cutoff characteristic as the shortest, and this necessitates using higher order birefringent networks with correspondingly larger numbers of elements. An eight channel version of the present invention is depicted in FIG. 3. Polarizing beam splitter prisms 10 and 30 are constructed from two glass prisms with an interface coated with a dielectric multilayer that reflects essentially all of the incident light with its electric vector normal to the plane of incidence (TE wave) and transmits essentially all of the incident light having its electric vector in the plane of incidence (TM wave). Polarizing beam splitter prisms 31 (FIGS. 2 and 3) and 32 (FIG. 3) are similarly constructed from three glass prisms coated on both of their interfaces. The design of such polarizing prisms and their coating are well known in the art. See, for example, U.S. Pat. No. 2,403,731, S. M. MacNeille, "Beam Splitter", issued July 9, 1946. Sequential networks of birefringent crystal elements 12 and 11 are as described above with transfer functions as depicted in FIGS. 1(a) and 1(b). The network 33 comprises 21 quartz crystal element plates with a thickness of 1522.5 microns, approximately half those of the network 12 and having rotational orientations selected by the synthesis procedure of Harris et al. referred to hereinabove. An appropriate set of rotational orientations for the 21 crystal elements is 45.00, 107.15, 107.15, 75.30, 75.30, 95.20, 95.20, 81.29, 81.29, 91.58, 91.58, 83.75, 83.75, 89.79, 89.79, 85.13, 85.13, 88.68, 88.68, 86.05 and 86.05 degrees. The wavelength components of the input beam 13 within eight successive channels are routed by the demultiplexer to one of the output beams 41 through 48 regardless of their polarization state. Further doubling of the channel capacity is satisfied by doubling of the lateral size of the last polarizing beam splitter 30, by adding a doubled size polarizing beam splitter (similar to the splitter 32), and by adding an additional sequential network of quartz crystal elements of order approximately twice the highest already present.

Various modifications can be performed without departing from the spirit and scope of this invention. For example, it will be apparent to one skilled in the art that the various teachings herein can be combined with teachings of others, for example, a multiplexer/demultiplexer can be constructed by having stages similar to those taught by Foley in combination with those taught as set forth in the appended claims.

What is claimed is:

1. In an n channel birefringent multiplexer/demultiplexer comprising $\log_2 n$ sequential networks of birefringent crystal elements, wherein n represents the number of optical wavelength channels capable of being multiplexed/demultiplexed and $\log_2 n$ is an integer greater than one, a combination of polarizing beam splitters,
   a first of said beam splitters being oriented before the first of said sequential networks,
   another of said beam splitters being oriented after the last of said sequential networks, and
   solely one such beam splitter being oriented between adjacent said sequential networks of birefringent crystal elements, such that,
      upon application of an input beam to said first beam splitter, horizontally and vertically polarized components thereof are separated thereat, independently traverse all of said sequential networks of said birefringent crystal elements, and are recombined to form output beams solely upon reaching said another beam splitter after said last of said sequential networks.

2. Multiple channel birefringent demultiplexing apparatus comprising
   $\log_2 n$ optical birefringent sequential networks serially coupled together, wherein n represents the number of optical wavelength channels capable of being demultiplexed and wherein $\log_2 n$ is an integer greater than one;
   an input polarizing beam splitting means coupled to a first of said birefringent sequential networks for converting an input beam of collimated light whose polarization is immaterial into two orthogonally polarized beams, said beams being parallel to each other;
   an output polarizing beam splitting means coupled to a last of said birefringent sequential networks for converting n intermediate beams, each intermediate beam having a pair of different wavelength channels with different polarizations into n independent single wavelength channel output beams of immaterial polarization; and
   solely one intermediate beam splitter means oriented between each adjacent pair of said birefringent sequential networks, each said one intermediate beam splitter means containing two beam splitting coatings, whereby
      upon application of an input beam to said input beam splitting means, horizontal and vertical polarized components thereof are separated thereby, independently traverse all of said sequential networks, including all said intermediate beam splitter means, and are recombined as said intermediate beams to form n output beams solely upon action by said output polarizing beam splitting means upon said n intermediate beams reaching said output beam splitting means.

3. Multiple channel birefringent demultiplexing apparatus comprising
   $\log_2 n$ optical birefringent sequential networks serially coupled together, wherein n represents the number of optical wavelength channels capable of being demultiplexed, and wherein $\log_2 n$ is an integer greater than one;
   an input polarizing beam splitting means, coupled to a first of said birefringent sequential networks, having a single beam splitting coating, for converting an input beam of collimated light whose polarization is immaterial into two orthogonally polarized beams, said beams being parallel to each other, one of said polarized beams being reflected once by said single beam splitting coating, the other of said polarized beams being transmitted once by said single beam splitting coating;
   solely one intermediate beam splitter means oriented between said first birefringent sequential network and an adjacent second of said birefringent sequential networks, said intermediate beam splitter means having two independent beam splitting coatings therein, wherein one of said polarized beams transformed by said first network means is directed to one of said two independent beam splitting coatings and the other of said polarized beams transformed by said first network means is directed to the other of said two independent beam splitting coatings, yield four transformed beams, parallel to each other; and
   an output polarizing beam splitting means having one beam splitting coating coupled to the output of the last birefringent sequential network for combining n pairs of wavelength channels at different polarizations to n single wavelength channel beams of immaterial polarization.

* * * * *